US010233387B2

(12) United States Patent
Qiu et al.

(10) Patent No.: US 10,233,387 B2
(45) Date of Patent: Mar. 19, 2019

(54) QUANTUM DOT ARTICLE WITH THIOL-ALKENE-EPOXY MATRIX

(71) Applicant: 3M INNOVATIVE PROPERTIES COMPANY, St. Paul, MN (US)

(72) Inventors: Zai-Ming Qiu, Woodbury, MN (US); Joseph M. Pieper, Atlanta, GA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/560,588

(22) PCT Filed: Apr. 7, 2016

(86) PCT No.: PCT/US2016/026363
§ 371 (c)(1),
(2) Date: Sep. 22, 2017

(87) PCT Pub. No.: WO2016/168048
PCT Pub. Date: Oct. 20, 2016

(65) Prior Publication Data
US 2018/0044582 A1   Feb. 15, 2018

Related U.S. Application Data

(60) Provisional application No. 62/148,212, filed on Apr. 16, 2015.

(51) Int. Cl.
| C09K 11/02 | (2006.01) |
| C09K 11/56 | (2006.01) |
| C09K 11/70 | (2006.01) |
| C08K 3/30 | (2006.01) |
| C09K 11/88 | (2006.01) |
| C08K 3/32 | (2006.01) |
| B82Y 20/00 | (2011.01) |
| B82Y 40/00 | (2011.01) |
| G02F 1/1335 | (2006.01) |

(52) U.S. Cl.
CPC .......... *C09K 11/02* (2013.01); *C08K 3/30* (2013.01); *C08K 3/32* (2013.01); *C09K 11/565* (2013.01); *C09K 11/70* (2013.01); *C09K 11/701* (2013.01); *C09K 11/883* (2013.01); B82Y 20/00 (2013.01); B82Y 40/00 (2013.01); C08K 2003/3036 (2013.01); G02F 1/133615 (2013.01); G02F 2001/133614 (2013.01); G02F 2202/36 (2013.01); Y10S 977/774 (2013.01); Y10S 977/818 (2013.01); Y10S 977/824 (2013.01); Y10S 977/892 (2013.01); Y10S 977/95 (2013.01); Y10S 977/952 (2013.01)

(58) Field of Classification Search
CPC ..... C09K 11/02; C09K 11/883; C09K 11/701; C09K 11/565; C08K 3/32; C08K 3/30; C08K 2003/3036; G02F 2001/133614; G02F 1/133615; B82Y 20/00; B82Y 40/00; Y10S 977/952; Y10S 977/95; Y10S 977/892; Y10S 977/818; Y10S 977/774
See application file for complete search history.

(56) References Cited

U.S. PATENT DOCUMENTS

| 3,018,262 | A | 1/1962 | Schroeder |
| 3,117,099 | A | 1/1964 | Proops |
| 3,708,296 | A | 1/1973 | Schlesinger |
| 4,069,055 | A | 1/1978 | Crivello |
| 4,216,288 | A | 8/1980 | Crivello |
| 4,250,311 | A | 2/1981 | Crivello |
| 4,279,717 | A | 7/1981 | Eckberg |
| 5,084,586 | A | 1/1992 | Farooq |
| 5,124,417 | A | 6/1992 | Farooq |
| 5,208,281 | A | 5/1993 | Glaser |
| 5,358,976 | A | 10/1994 | Dowling |
| 5,459,173 | A | 10/1995 | Glaser |
| 5,554,664 | A | 9/1996 | Lamanna |
| 5,650,261 | A | 7/1997 | Winkle |
| 5,753,346 | A | 5/1998 | Leir |
| 5,876,805 | A | 3/1999 | Ostlie |
| 6,153,719 | A | 11/2000 | Abbey |
| 7,018,713 | B2 | 3/2006 | Padiyath |
| 7,374,807 | B2 | 5/2008 | Parce |
| 7,645,397 | B2 | 1/2010 | Parce |
| 8,283,412 | B2 | 10/2012 | Liu |
| 8,343,575 | B2 | 1/2013 | Dubrow |
| 8,425,803 | B2 | 4/2013 | Parce |
| 8,592,037 | B2 | 11/2013 | Parce |

(Continued)

FOREIGN PATENT DOCUMENTS

| JP | 2008-248169 | 10/2008 |
| JP | 2016-141743 | 8/2016 |

(Continued)

OTHER PUBLICATIONS

Cameron, "Base Catalysis in Imaging Materials. 1. Design and Synthesis of Novel Light-Sensitive Urethanes as Photoprecursors of Amines", Journal of Organic Chemistry, 1990, vol. 55, pp. 5919-5922.

Frechet, "Photogenerated Amines and Diamines: Novel Curing Systems for Thin Film Coatings", Journal of Polymer Materials Science and Engineering, 1991, vol. 64, pp. 55-56.

Cameron, "Photogeneration of Organic Bases from o-Nitrobenzyl-Derived Carbamates", Journal of American Chemical Society, 1991, vol. 113, No. 11, pp. 4303-4313.

Cole, "Redox Initiation of Bulk Thiol-ene Polymerizations", The Royal Society of Chemistry, Polymer Chemistry, 2013, vol. 4, pp. 1167-1175.

(Continued)

*Primary Examiner* — Alexander C Kollias
(74) *Attorney, Agent, or Firm* — Kent S. Kokko; Lisa P. Fulton

(57) ABSTRACT

Described is a quantum dot film article comprising a quantum dot of a cured thiol-alkene-epoxy matrix. The matrix formulations resist ingress from water and/or oxygen, while also providing acceptable color stability upon aging.

20 Claims, 2 Drawing Sheets

(56) References Cited

U.S. PATENT DOCUMENTS

| | | |
|---|---|---|
| 8,848,132 B2 | 9/2014 | O'Neill |
| 9,574,132 B2 | 2/2017 | Qiu |
| 2002/0013449 A1 | 1/2002 | Zook |
| 2003/0066998 A1* | 4/2003 | Lee ............... B82Y 10/00 257/19 |
| 2005/0244975 A1 | 11/2005 | Rakow |
| 2007/0112100 A1 | 5/2007 | Byers |
| 2008/0001124 A1* | 1/2008 | Hachiya ............. C09D 11/30 252/301.36 |
| 2013/0105854 A1* | 5/2013 | Jang ............... H01L 33/56 257/100 |
| 2013/0148057 A1 | 6/2013 | Kang |
| 2013/0345458 A1 | 12/2013 | Freeman |
| 2014/0071381 A1 | 3/2014 | Jang |
| 2015/0083970 A1 | 3/2015 | Koh |
| 2015/0098212 A1 | 4/2015 | Won |
| 2017/0321116 A1 | 11/2017 | Satake et al. |

FOREIGN PATENT DOCUMENTS

| | | |
|---|---|---|
| KR | 10-2012-0095486 | 8/2012 |
| WO | WO 1996-35238 | 11/1996 |
| WO | WO 2007-015815 | 2/2007 |
| WO | WO 2010-141274 | 12/2010 |
| WO | WO 2014-024068 | 2/2014 |
| WO | WO 2014-113562 | 7/2014 |
| WO | WO 2015-095296 | 6/2015 |
| WO | WO 2016-003986 | 1/2016 |
| WO | WO 2016-081219 | 5/2016 |
| WO | WO 2016-167927 | 10/2016 |

OTHER PUBLICATIONS

Crivello, "Epoxidized Triglycerides as Renewable Monomers in Photoinitiated Cationic Polymerization", Chemistry of Materials, 1992, vol. 4, pp. 692-699.
Dietliker, Chemistry and Technology of UV and EB Formulation for Coatings, Inks and Paints, 13pgs (1991).
Hoyle, "Thiol-Ene Click Chemistry", Angewandte Chemie International Edition, 2010, vol. 49, pp. 1540-1573.
Hoyle, "Thiol-Enes: Chemistry of the Past with Promise for the Future", Journal of Polymer Science: Part A: Polymer Chemistry, 2004, vol. 42 pp. 5301-5338.
Lee, Handbook of Epoxy Resins, 3pgs (1967).
Lubkowsha, "Aminoalkyl Functionalized Siloxanes", Polimery, 2014, vol. 59, pp. 763-768.
Othmer, Kirk-Othmer Encyclopedia of Chemical Technology, 253-255, (1998).
Quantaurus-QY Absolute PL Quantum Yield Spectrometer, Hamamatsu, [Retrieved from the internet on Oct. 30, 2017], <http://www.hamamatsu.com/us/en/product/alpha/P/5033/index.html>.
Shirai, "Photoacid and Photobase Generators: Chemistry and Applications to Polymeric Materials", Progress in Polymer Science, 1996, vol. 21, pp. 1-45, XP-002299394.
Tachi, "Photochemical Reactions of Quaternary Ammonium Dithiocarbamates as Photobase Generators and Their Use in the Photoinitiated Thermal Crosslinking of Poly(gycidylmethacrylate)", Journal of Polymer Science, Part A: Polymer Chemistry, 2001, vol. 39, pp. 1329-1341.
Zhu, "Synthesis and Optical Properties of Thiol Functionalized CdSe/ZnS (Core/Shell) Quantum Dots by Ligand Exchange", Journal of Nanomaterials, Mar. 2014, vol. 2014, pp. 1-14.
International Search Report for PCT International Application No. PCT/US2016/026363, dated Jul. 26, 2016, 4pgs.

* cited by examiner

US 10,233,387 B2

QUANTUM DOT ARTICLE WITH THIOL-ALKENE-EPOXY MATRIX

CROSS REFERENCE TO RELATED APPLICATIONS

This application is a national stage filing under 35 U.S.C. 371 of PCT/US2016/026363, filed Apr. 7, 2016, which claims the benefit of U.S. Application No. 62/148,212, filed Apr. 16, 2015, the disclosure of which is incorporated by reference in its/their entirety herein.

BACKGROUND

Quantum Dot Enhancement Films (QDEF) are used for LCD displays. Red and green quantum dots are used in QDEF with a blue LED as the light source to give the full spectrum of colors. This has the advantage of improving the color gamut over the typical LCD display and keeping the energy consumption low compared to OLED or LED displays.

Quantum dot film articles include quantum dots dispersed in a matrix that is laminated between two barrier layers. The quantum dot articles, which include combinations of green and red quantum dots as fluorescing elements, can enhance color gamut performance when used in display devices such as, for example, liquid crystal displays (LCDs).

Quantum dots are highly sensitive to degradation, so the quantum dot article should have excellent barrier properties to prevent ingress of water and oxygen, which degrade the performance of the articles. Barrier layers protect the quantum dots in the interior regions of the laminate construction from damage caused by oxygen or water exposure, but the cut edges of the article expose the matrix materials to the atmosphere. In these edge regions the protection of the quantum dots dispersed in the matrix is primarily dependent on the barrier properties of the matrix itself.

If water and/or oxygen enter the edge regions of the quantum dot article, the quantum dots on or adjacent to the exposed edge of the laminate construction can degrade and ultimately fail to emit light when excited by ultraviolet or visible light. This type of quantum dot degradation, referred to as edge ingress, can cause a dark line around a cut edge of the film article, which can be detrimental to performance of a display in which the quantum dot article forms a part. Therefore, there is a need for matrix having better barrier properties for protection of quantum dots in QDEF from degradation for longer life stability.

SUMMARY

In general, the present disclosure is directed to matrix formulations for use in quantum dot articles. The matrix formulations resist ingress from water and/or oxygen, while also providing acceptable color stability upon aging. In one embodiment, the present disclosure is directed to a film article including a first barrier layer; a second barrier layer; and a quantum dot layer between the first barrier layer and the second barrier layer. The quantum dot layer includes quantum dots dispersed in a matrix including a cured thiol-alkenyl resin.

More particularly, the thiol-alkene-epoxy matrix is the cured reaction product comprising a polythiol, a polyalkenyl compound (polyalkene), and an epoxy resin, each of which has a functionality of ≥2.

With the thiol-alkene-epoxy matrix, edge ingress of the converted parts is observed to not exceed 1 mm after 100+ hours of accelerated aging. In various embodiments, the matrix materials described in this disclosure limit the edge ingress after aging in 65° C. at 95% relative humidity or 85° C. conditions to less than 0.5 mm, and have a color change that does not exceed 0.02, or even 0.005, in both x and y from the initial measurement in the 1931 CIE coordinate system. These matrix formulations can extend the useful life of the quantum dot articles in display applications.

As used herein

"thiol-alkene-epoxy" refers to the reaction mixture of a polythiol and a polyalkenyl compound having two or more alkenyl groups, and an epoxy resin and is used exclusive from thiol-ene reactions with alkynes and (meth)acrylates.

"Alkyl" means a linear or branched, cyclic or acylic, saturated monovalent hydrocarbon.

"Alkylene" means a linear or branched unsaturated divalent hydrocarbon.

"Alkenyl" means a linear or branched unsaturated hydrocarbon.

"Aryl" means a monovalent aromatic, such as phenyl, naphthyl and the like.

"Arylene" means a polyvalent, aromatic, such as phenylene, naphthalene, and the like.

"Aralkylene" means a group defined above with an aryl group attached to the alkylene, e.g., benzyl, 1-naphthylethyl, and the like.

As used herein, "(hetero)hydrocarbyl" is inclusive of hydrocarbyl alkyl and aryl groups, and heterohydrocarbyl heteroalkyl and heteroaryl groups, the later comprising one or more catenary (in-chain) heteroatoms such as ether or amino groups.

Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", and "aryl" supra.

The term "composite particle" as used herein refers to a nanoparticle, which is typically in the form of a core/shell nanoparticle (preferably, nanocrystal), having any associated organic coating or other material on the surface of the nanoparticle that is not removed from the surface by ordinary solvation. Such composite particles are useful as "quantum dots," which have a tunable emission in the near ultraviolet (UV) to far infrared (IR) range as a result of the use of a semiconductor material.

The term "nanoparticle" refers to a particle having an average particle diameter in the range of 0.1 to 1000 nanometers such as in the range of 0.1 to 100 nanometers or in the range of 1 to 100 nanometers. The term "diameter" refers not only to the diameter of substantially spherical particles but also to the distance along the smallest axis of the structure. Suitable techniques for measuring the average particle diameter include, for example, scanning tunneling microscopy, light scattering, and transmission electron microscopy.

A "core" of a nanoparticle is understood to mean a nanoparticle (preferably, a nanocrystal) to which no shell has been applied or to the inner portion of a core/shell nanoparticle. A core of a nanoparticle can have a homogenous composition or its composition can vary with depth inside the core. Many materials are known and used in core nanoparticles, and many methods are known in the art for applying one or more shells to a core nanoparticle. The core has a different composition than the shells. The core typically has a different chemical composition than the shell of the core/shell nanoparticle.

As used herein "thiol-alkene-epoxy" refers to a cured or uncured resin derived from a reactive mixture of polythiol, polyalkene and polyepoxy components.

As used herein, the term "actinic radiation" refers to radiation in any wavelength range of the electromagnetic spectrum. The actinic radiation is typically in the ultraviolet wavelength range, in the visible wavelength range, in the infrared wavelength range, or combinations thereof. Any suitable energy source known in the art can be used to provide the actinic radiation.

DETAILED DESCRIPTION

Figure 1:
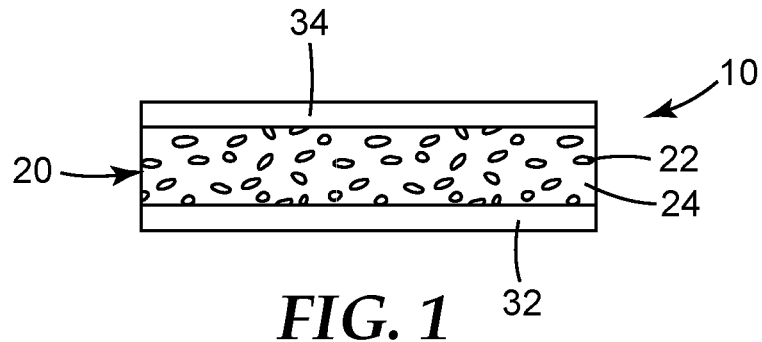
FIG. 1 is a schematic side elevation view of an edge region of an illustrative film article including quantum dots.

The present disclosure provides a quantum dot film article comprising a first barrier layer, a second barrier layer; and a quantum dot layer between the first barrier layer and the second barrier layer, the quantum dot layer comprising quantum dots dispersed in a matrix comprising a cured thiol-alkene-epoxy having a $T_g > 20°$ C.

The cured thiol-alkene-epoxy matrix or binder is the reaction product of a polythiol compound, a polyalkene compound and an epoxy compound or resin wherein each has a functionality of $\geq 2$. Preferably both the polythiol compound and polyalkene compound has a functionality of $> 2$. It will be understood that a mono-epoxy compound has a functionality of 2 as the electrophilic epoxy group generates a nucleophilic hydroxy group on ring-opening, and the hydroxy group may then react with additional epoxy groups, but it is preferred that the epoxy resin has at least two epoxy groups.

The present disclosure provides a quantum dot article comprising a first barrier film, a second barrier film; and a quantum dot layer between the first barrier film and the second barrier film, the quantum dot layer comprising quantum dots dispersed in a matrix comprising a cured thiol-alkene-epoxide having a $T_g > 20°$ C.

The polythiol reactant in the thiol-alkene-epoxy resin is of the formula:

$$R^2(SH)_y,  \quad\quad\quad I$$

where $R^2$ is (hetero)hydrocarbyl group having a valence of y, and y is $\geq 2$, preferably $> 2$. The thiol groups of the polythiols may be primary or secondary. The compounds of Formula I may include a mixture of compounds having an average functionality of two or greater.

$R^2$ includes any (hetero)hydrocarbyl groups, including aliphatic and aromatic polythiols. $R^2$ may optionally further include one or more functional groups including pendent hydroxyl, acid, ester, or cyano groups or catenary (in-chain) ether, urea, urethane and ester groups.

In one embodiment, $R^2$ comprises a non-polymeric aliphatic or cycloaliphatic moiety having from 1 to 30 carbon atoms. In another embodiment, $R^2$ is polymeric and comprises a polyoxyalkylene, polyester, polyolefin, polyacrylate, or polysiloxane polymer having pendent or terminal reactive —SH groups. Useful polymers include, for example, thiol-terminated polyethylenes or polypropylenes, and thiol-terminated poly(alkylene oxides).

Specific examples of useful polythiols include 2,3-dimercapto-1-propanol, 2-mercaptoethyl ether, 2-mercaptoethyl sulfide, 1,6-hexanedithiol, 1,8-octanedithiol, 1,8-dimercapto-3,6-dithiaoctane, propane-1,2,3-trithiol, and trithiocyanuric acid.

Another useful class of polythiols includes those obtained by esterification of a polyol with a terminally thiol-substituted carboxylic acid (or derivative thereof, such as esters or acyl halides) including α- or β-mercaptocarboxylic acids such as thioglycolic acid, β-mercaptopropionic acid, 2-mercaptobutyric acid, or esters thereof.

Useful examples of commercially available compounds thus obtained include ethylene glycol bis(thioglycolate), pentaerythritol tetrakis(3-mercaptopropionate), dipentaerythritol hexakis(3-mercaptopropionate), ethylene glycol bis(3-mercaptopropionate), trimethylolpropane tris(thioglycolate), trimethylolpropane tris(3-mercaptopropionate), pentaerythritol tetrakis(thioglycolate), pentaerythritol tetrakis(3-mercaptopropionate), pentaerithrytol tetrakis (3-mercaptobutylate), and 1,4-bis 3-mercaptobutylyloxy butane, tris[2-(3-mercaptopropionyloxy)ethyl]isocyanurate, trimethylolpropane tris(mercaptoacetate), 2,4-bis(mercaptomethyl)-1, 3, 5,-triazine-2, 4-dithiol, 2, 3-di(2-mercaptoethyl) thio)-1-propanethiol, dimercaptodiethylsufide, and ethoxylated trimethylpropan-tri(3-mercaptopropionate.

A specific example of a polymeric polythiol is polypropylene ether glycol bis(3-mercaptopropionate) which is prepared by esterification of polypropylene-ether glycol (e.g., Pluracol™ P201, BASF Wyandotte Chemical Corp.) and 3-mercaptopropionic acid by esterification.

Useful soluble, high molecular weight thiols include polyethylene glycol di(2-mercaptoacetate), LP-3™ resins supplied by Morton Thiokol Inc. (Trenton, N.J.), and Permapol P3™ resins supplied by Products Research & Chemical Corp. (Glendale, Calif.) and compounds such as the adduct of 2-mercaptoethylamine and caprolactam.

Preferred polythiols include the following:
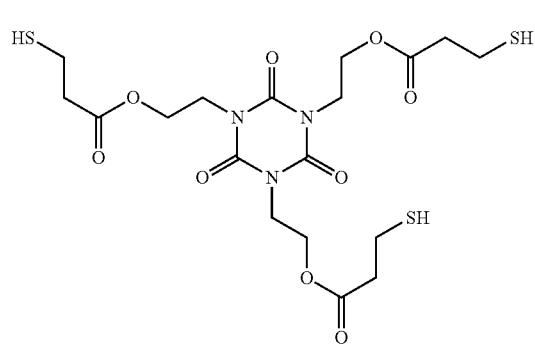
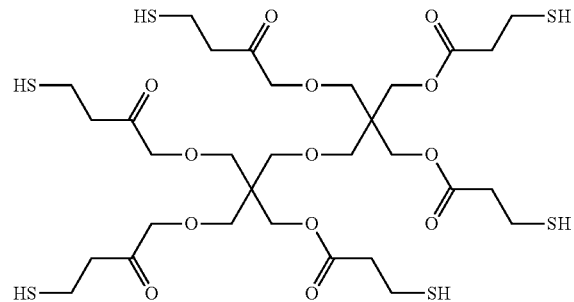
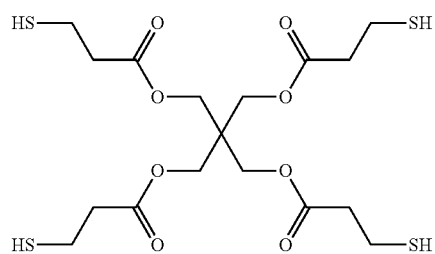
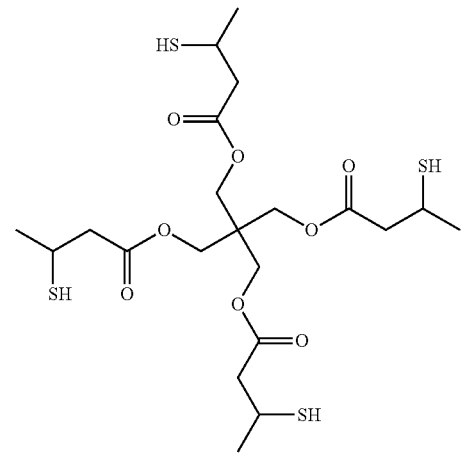
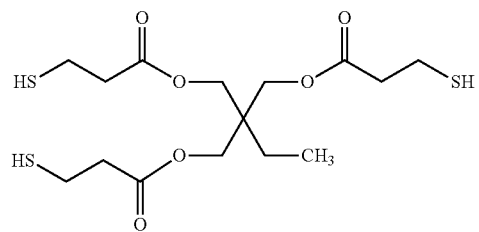
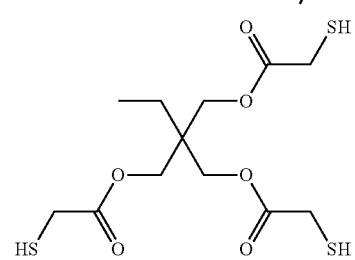
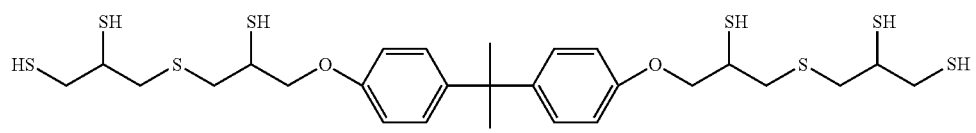
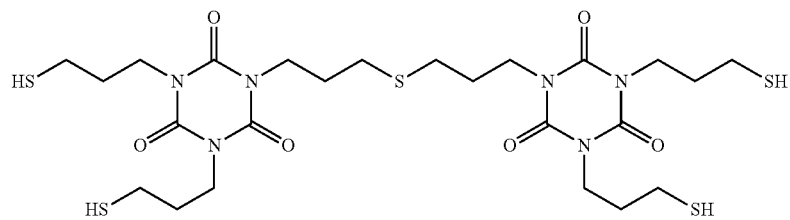
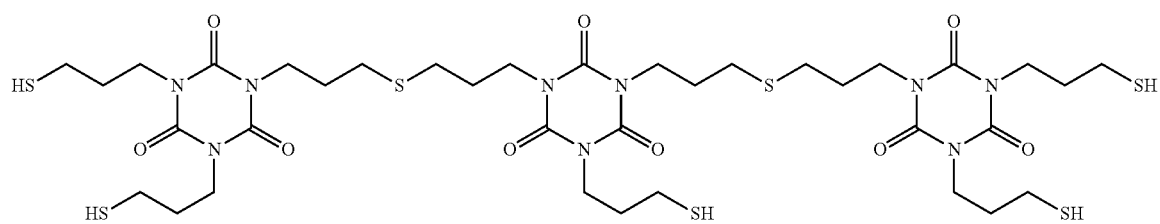

The curable composition contains a polyalkene compound having at least two reactive alkene groups. Such compounds are of the general formula:

$$R^1 \text{--} [\text{CR}^{10}\text{=CHR}^{11}]_x, \quad \text{II}$$

where
$R^1$ is a polyvalent (hetero)hydrocarbyl group,
each of $R^{10}$ and $R^{11}$ are independently H or $C_1$-$C_4$ alkyl;
and x is ≥2.

The compounds of Formula II may include polyalkenes, such as polyaliphatic-enes (e.g. 1,2-butadiene oligomer and co-oligers), polyvinyl-enes (vinyl ethers), and polyallyl-enes (allyl ethers). For amine ligand stabilized quantum dots, non-acrylate based polyene or polyalkene is preferred for formulation stability.

In some embodiments, $R^1$ is an aliphatic or aromatic group. Rican be selected from alkyl groups of 1 to 20 carbon atoms or aryl aromatic group containing 6-18 ring atoms. $R^2$ has a valence of x, where x is at least 2, preferably greater than 2. $R^1$ optionally contains one or more esters, amide, ether, thioether, urethane, or urea functional groups. The compounds of Formula I may include a mixture of compounds having an average functionality of two or greater. In some embodiments, $R^{10}$ and $R^{11}$ may be taken together to form a ring.

In some embodiments, $R^1$ is a heterocyclic group. Heterocyclic groups include both aromatic and non-aromatic ring systems that contain one or more nitrogen, oxygen and sulfur heteroatoms. Suitable heteroaryl groups include furyl, thienyl, pyridyl, quinolinyl, tetrazolyl, imidazo, and triazinyl. The heterocyclic groups can be unsubstituted or substituted by one or more substituents selected from the group consisting of alkyl, alkoxy, alkylthio, hydroxy, halogen, haloalkyl, polyhaloalkyl, perhaloalkyl (e.g., trifluoromethyl), trifluoroalkoxy (e.g., trifluoromethoxy), nitro, amino, alkylamino, dialkylamino, alkylcarbonyl, alkenylcarbonyl, arylcarbonyl, heteroarylcarbonyl, aryl, arylalkyl, heteroaryl, heteroarylalkyl, heterocyclyl, heterocycloalkyl, nitrile and alkoxycarbonyl.

In some embodiments, the alkene compound is the reaction product of a polyisocyanate:

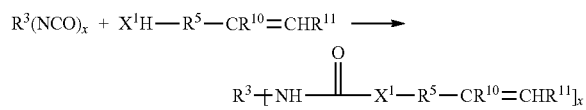

where
$R^3$ is a (hetero)hydrocarbyl group;
$X^1$ is —O—, —S— or —NR$^4$—, where $R^4$ is H of $C_1$-$C_4$ alkyl;
each of $R^{10}$ and $R^{11}$ are independently H or $C_1$-$C_4$ alkyl;
$R^5$ is a (hetero)hydrocarbyl group,
x is ≥2.

In particular $R^5$ may be alkylene, arylene, alkarylene, aralkylene, with optional in-chain heteroatoms. $R^5$ can be selected from alkyl groups of 1 to 20 carbon atoms or aryl aromatic group containing 6-18 ring atoms. $R^2$ has a valence of x, where x is at least 2, preferably greater than 2. $R^1$ optionally contains one or more ester, amide, ether, thioether, urethane, or urea functional groups.

Polyisocyanate compounds useful in preparing the alkene compounds comprise isocyanate groups attached to the multivalent organic group that can comprise, in some embodiments, a multivalent aliphatic, alicyclic, or aromatic moiety ($R^3$); or a multivalent aliphatic, alicyclic or aromatic moiety attached to a biuret, an isocyanurate, or a uretdione, or mixtures thereof. Preferred polyfunctional isocyanate compounds contain at least two isocyanate (—NCO) radicals. Compounds containing at least two —NCO radicals are preferably comprised of di- or trivalent aliphatic, alicyclic, aralkyl, or aromatic groups to which the —NCO radicals are attached.

Representative examples of suitable polyisocyanate compounds include isocyanate functional derivatives of the polyisocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, aralkyl, or aromatic polyisocyanate, may be used either singly or in mixtures of two or more.

The aliphatic polyisocyanate compounds generally provide better light stability than the aromatic compounds. Aromatic polyisocyanate compounds, on the other hand, are generally more economical and reactive toward nucleophiles than are aliphatic polyisocyanate compounds. Suitable aromatic polyisocyanate compounds include, but are not limited to, those selected from the group consisting of 2,4-toluene diisocyanate (TDI), 2,6-toluene diisocyanate, an adduct of TDI with trimethylolpropane (available as Desmodur™ CB from Bayer Corporation, Pittsburgh, Pa.), the isocyanurate trimer of TDI (available as Desmodur™ IL from Bayer Corporation, Pittsburgh, Pa.), diphenylmethane 4,4'-diisocyanate (MDI), diphenylmethane 2,4'-diisocyanate, 1,5-diisocyanato-naphthalene, 1,4-phenylene diisocyanate, 1,3-phenylene diisocyanate, 1-methoxy-2,4-phenylene diisocyanate, 1-chlorophenyl-2,4-diisocyanate, and mixtures thereof.

Examples of useful alicyclic polyisocyanate compounds include, but are not limited to, those selected from the group consisting of dicyclohexylmethane diisocyanate ($H_{12}$ MDI, commercially available as Desmodur™ available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), dimer acid diisocyanate (available from Bayer), 1,3-bis(isocyanatomethyl) cyclohexane ($H_6$ XDI), 3-isocyanatomethyl-3,5,5-trimethylcyclohexyl isocyanate, and mixtures thereof.

Examples of useful aliphatic polyisocyanate compounds include, but are not limited to, those selected from the group consisting of tetramethylene 1,4-diisocyanate, hexamethylene 1,4-diisocyanate, hexamethylene 1,6-diisocyanate (HDI), octamethylene 1,8-diisocyanate, 1,12-diisocyanatododecane, 2,2,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (Desmodur™ N-100 and N-3200 from Bayer Corporation, Pittsburgh, Pa.), the isocyanurate of HDI (available as Desmodur™ N-3300 and Desmodur™ N-3600 from Bayer Corporation, Pittsburgh, Pa.), a blend of the isocyanurate of HDI and the uretdione of HDI (available as Desmodur™ N-3400 available from Bayer Corporation, Pittsburgh, Pa.), and mixtures thereof.

Examples of useful aralkyl polyisocyanates (having alkyl substituted aryl groups) include, but are not limited to, those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, p-(1-isocyanatoethyl)phenyl isocyanate, m-(3-isocyanatobutyl)phenyl isocyanate, 4-(2-isocyanatocyclohexyl-methyl)phenyl isocyanate, and mixtures thereof.

Preferred polyisocyanates, in general, include those selected from the group consisting of 2,2,4-trimethyl-hexamethylene diisocyanate (TMDI), tetramethylene 1,4-diisocyanate, hexamethylene 1,4-diisocyanate, hexamethylene 1,6-diisocyanate (HDI), octamethylene 1,8-diisocyanate, 1,12-diisocyanatododecane, mixtures thereof, and a biuret, an isocyanurate, or a uretdione derivatives.

In some preferred embodiments, the alkene compound is a cyanurate or isocyanurate of the formulas:

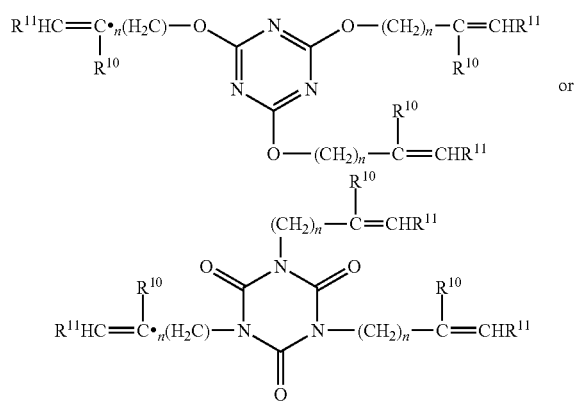

where n is at least one;
each of $R^{10}$ and $R^{11}$ are independently H or $C_1$-$C_4$ alkyl.

The polyalkene may be prepared by reaction of a bis-alkenyl amine, such a $HN(CH_2CH=CH_2)$, with either a di- or higher epoxy compound, or with a bis- or high (meth)acrylate, or a polyisocyanate.

The polyalkene may be prepared by alkylation of a polyol with an α-halo ω-olefin, such as an allyl halide, e.g. alkylation of penterithritol with an allyl halide. Alternatively, the polyalkene may be prepared by reaction of a polyol with a compound having an isocyanate groups and a terminal alkene group.

The polyalkene may be prepared by reaction of a hydroxy-functional polyalkenyl compound, such as $(CH_2=CH-CH_2-O)_n-R-OH$ with a polyepoxy compound or a polyisocyanate.

An oligomeric polyalkene may be prepared by reaction between a hydroxyalkyl (meth)acrylate and an allyl glycidyl ether.

In some preferred embodiments, the polyalkene and/or the polythiol compounds are oligomeric and prepared by reaction of the two with one in excess. For example, polythiols of Formula I may be reacted with an excess of polyalkenes of Formula I such that an oligomeric polyalkene results having a functionality of at least two. Conversely an excess of polythiols of Formula I may be reacted with the polyalkenes of Formula II such that an oligomeric polythiol results having a functionality of at least two. The oligomeric polyalkenes and polythiols may be represented by the following formulas, where subscript z is two or greater. $R^1$, $R^2$, $R^{10}$, $R^{11}$, y and x are as previously defined.

In the following formulas, a linear thiol-alkene polymer is shown for simplicity. It will be understood that the pendent ene group of the first polymer will have reacted with the excess thiol, and the pendent thiol groups of the second polymer will have reacted with the excess alkene.

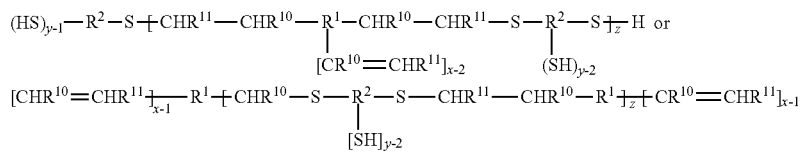

Other useful polyalkene compounds include the following.

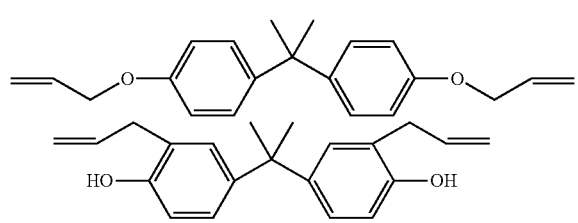

The polyalkene compounds may be prepared as the reaction product of a polythiol compound and an epoxy-alkene compound. Similarly, the polyalkene compound may be prepared by reaction of a polythiol or polyol with a di- or higher epoxy compound, followed by reaction with an epoxy-alkene compound. Alternatively, a polyamino compound may be reacted with an epoxy-alkene compound, or a polyamino compound may be reacted a di- or higher epoxy compound, followed by reaction with an epoxy-alkene compound.

The composition further comprises an epoxy resin. Suitable epoxy resins include monomeric or oligomeric epoxy compounds that can be aliphatic, alicyclic, aromatic, or heterocyclic. These materials generally have, on the average, ≥1 polymerizable epoxy group per molecule. Some epoxy resins have ≥1.5 or ≥2 polymerizable epoxy groups per molecule. The oligomeric epoxides can be linear oligomers having terminal epoxy groups (for example, a diglycidyl ether of a polyoxyalkylene glycol), oligomers having skeletal epoxy units (for example, polybutadiene polyepoxide), or oligomers having pendant epoxy groups (for example, a glycidyl methacrylate oligomer or co-oligomer). The epoxides can be pure compounds or can be mixtures of compounds containing one, two, or more epoxy groups per molecule. These epoxy-containing materials can have a backbone of any type and with any suitable substituent group thereon that does not substantially interfere with cure. Illustrative of permissible substituent groups include halogens, ester groups, ethers, sulfonate groups, siloxane groups, nitro groups, phosphate groups, and the like. The average molecular weight of the epoxy-containing materials can vary from about 58 g/mole to about 1000 g/mole or more.

Useful epoxy resins include glycidyl ether compounds of Formula IV

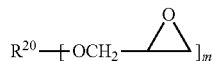

where $R^{20}$ is (hetero)hydrocarbyl group having a valence of m, and m is ≥2, preferably >2. The compounds of Formula IV may include a mixture of compounds having an average functionality of two or greater.

$R^{20}$ includes any (hetero)hydrocarbyl groups, including aliphatic and aromatic polythiols. $R^{20}$ may optionally further include one or more functional groups including pendent hydroxyl, acid, ester, or cyano groups or catenary (in-chain) ether, urea, urethane, ester groups, amides, thioethers, functional groups In one embodiment, $R^{20}$ comprises a non-polymeric aliphatic or cycloaliphatic moiety having from 1 to 30 carbon atoms. In another embodiment, $R^{20}$ is polymeric and comprises a polyoxyalkylene, polyester, polyolefin, polyacrylate, or polysiloxane polymer having pendent or terminal reactive epoxy groups. Useful polymers include, for example, epoxy-terminated polyethylenes or polypropylenes, and epoxy-terminated poly(alkylene oxides).

Exemplary epoxides are glycidyl ethers of polyhydric phenols that can be obtained by reacting a polyhydric phenol with an excess of a chlorohydrin such as epichlorohydrin (for example, the diglycidyl ether of 2,2-bis-(2,3-epoxypropoxyphenol)-propane). Additional examples of epoxides of this type are described in U.S. Pat. No. 3,018,262, and in Handbook of Epoxy Resins, Lee and Neville, McGraw-Hill Book Co., New York (1967).

Numerous commercially available epoxy resins can be utilized. In particular, epoxides that are readily available include resins of octadecylene oxide, epichlorohydrin, styrene oxide, vinyl cyclohexene oxide, glycidol, glycidyl methacrylate, diglycidyl ethers of Bisphenol A (for example, EPON 828, EPON 825, EPON 1004, and EPON 1001 from Momentive Specialty Chemicals) as well as DER 221, DER 332, and DER 334 from Dow Chemical Co., Midland, Mich.), vinylcyclohexene dioxide (for example, ERL 4206 from Union Carbide), 3,4-epoxycyclohexylmethyl-3,4-epoxycyclohexene carboxylate (for example, ERL 4221, CYRACURE UVR 6110, and CYRACURE UVR 6105 from Union Carbide), 3,4-epoxy-6-methylcyclohexylmethyl-3,4-epoxy-6-methyl-cyclohexene carboxylate (for example, ERL 4201 from Union Carbide), bis(3,4-epoxy-6-methylcyclohexylmethyl) adipate (for example, ERL 4289), bis(2,3-epoxycyclopentyl) ether (for example, ERL 0400), aliphatic epoxy modified from polypropylene glycol (for example, ERL 4050 and ERL 4052), dipentene dioxide (for example, ERL 4269), epoxidized polybutadiene (for example, OXIRON 2001 from FMC Corp.), silicone resin containing epoxy functionality, flame retardant epoxy resins such as brominated bisphenol-type epoxy resins (for example, DER 580), 1,4-butanediol diglycidyl ether of phenol formaldehyde novolak (for example, DEN 431 and DEN 438 from Dow Chemical), resorcinol diglycidyl ether (for example, KOPOXITE from Koppers Company, Inc.), bis(3,4-epoxycyclohexylmethyl)adipate (for example, ERL 4299 or CYRACURE UVR 6128), 2-(3,4-epoxycyclohexyl-5, 5-spiro-3,4-epoxy) cyclohexane-meta-dioxane (for example, ERL-4234), vinylcyclohexene monoxide, 1,2-epoxyhexadecane (for example, CYRACURE UVR-6216), alkyl glycidyl ethers such as alkyl $C_8$—$C_{10}$ glycidyl ether (for example, HELOXY MODIFIER 7 from Resolution Performance Products), alkyl $C_{12}$-$C_{14}$ glycidyl ether (for example, HELOXY MODIFIER 8 from Momentive Specialty Chemicals), butyl glycidyl ether (for example, HELOXY MODIFIER 61 from), cresyl glycidyl ether (for example, HELOXY MODIFIER 62), p-tert-butylphenyl glycidyl ether (for example, HELOXY MODIFIER 65), polyfunctional glycidyl ethers such as diglycidyl ether of 1,4-butanediol (for example, HELOXY MODIFIER 67), diglycidyl ether of neopentyl glycol (for example, HELOXY MODIFIER 68), diglycidyl ether of cyclohexanedimethanol (for example, HELOXY MODIFIER 107), trimethylol ethane triglycidyl ether (for example, HELOXY MODIFIER 44), trimethylol propane triglycidyl ether (for example, HELOXY 48), polyglycidyl ether of an aliphatic polyol (for example, HELOXY MODIFIER 84), polyglycol diepoxide (for example, HELOXY MODIFIER 32), bisphenol F epoxides (for example, EPON 862 and Araldite GY-281 from Huntsman Advanced Materials), a bisphenol A epoxy methacrylate oligomer (for example SARTOMER CN154 from Sartomer Americas) and 9,9-bis[4-(2,3-epoxypropoxy)-phenylfluorenone (for example, EPON 1079 from Momentive Specialty Chemicals).

Other useful epoxy-containing materials include those that contain cyclohexene oxide groups such as epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl) adipate. A more detailed list of useful epoxides of this nature is set forth in U.S. Pat. No. 3,117,099 (Proops et al).

Other useful epoxy resins are well known and contain such epoxides as epichlorohydrins, alkylene oxides (for example, propylene oxide), styrene oxide, alkenyl oxides (for example, butadiene oxide), and glycidyl esters (for example, ethyl glycidate). Still other useful epoxy resins include epoxy-functional silicones such as those described in U.S. Pat. No. 4,279,717 (Eckberg et al.), which are commercially available from the General Electric Company. These epoxy resins are polydimethylsiloxanes in which 1 to 20 mole percent of the silicon atoms have been substituted with epoxyalkyl groups (preferably, epoxy cyclohexylethyl, as described in U.S. Pat. No. 5,753,346 (Leir et al.)).

Blends of various epoxy-containing materials can also be utilized. Suitable blends can include two or more weight average molecular weight distributions of epoxy-containing compounds such as low molecular weight epoxides (e.g., having a weight average molecular weight below 200 g/mole), intermediate molecular weight epoxides (e.g., having a weight average molecular weight in the range of about 200 to 1000 g/mole), and higher molecular weight epoxides (e.g., having a weight average molecular weight above about 1000 g/mole). Alternatively or additionally, the epoxy resin can contain a blend of epoxy-containing materials having different chemical natures such as aliphatic and aromatic or different functionalities such as polar and non-polar.

Preferred epoxy resins include the following:

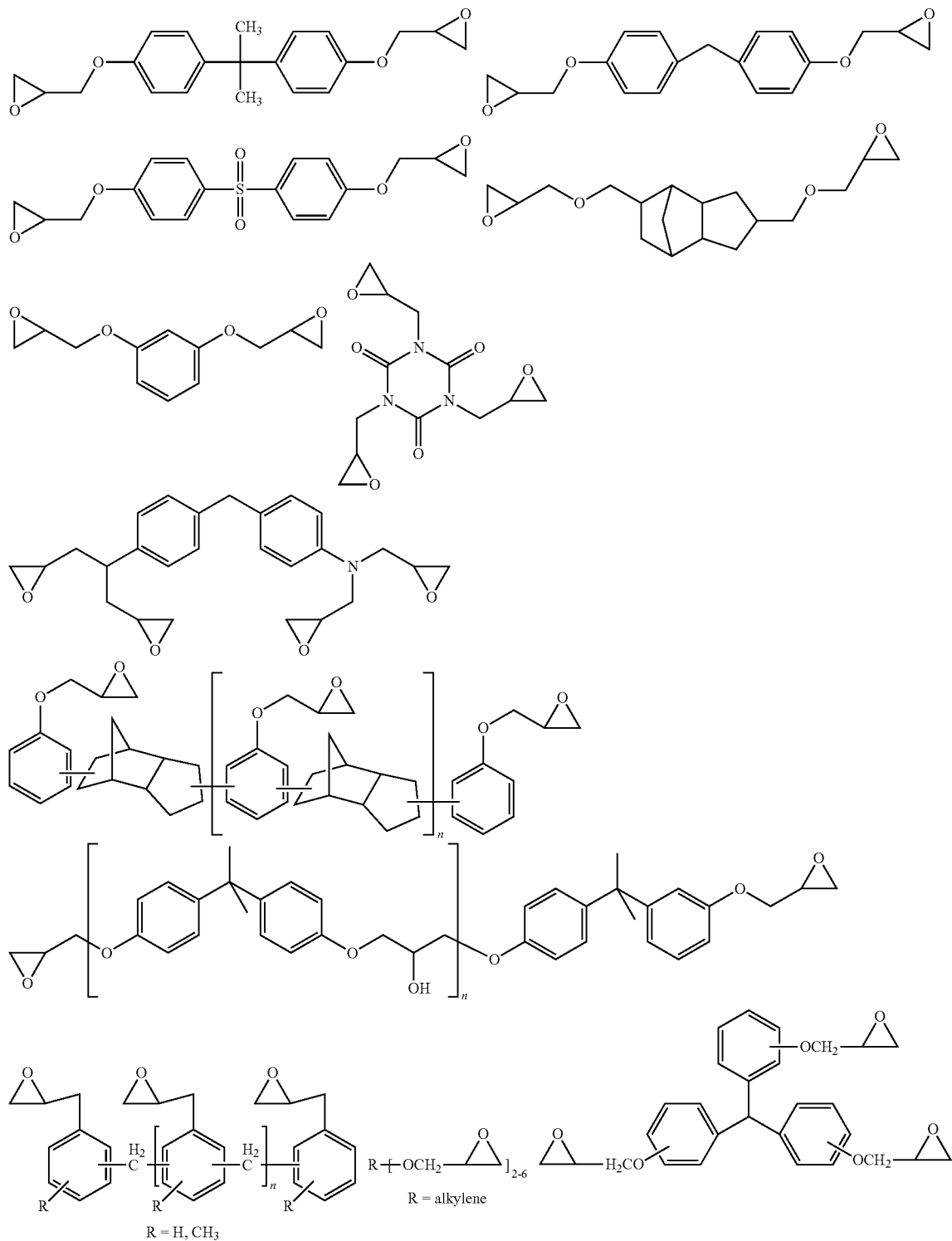

The components are generally used in approximately 1:1 molar amounts of thiol groups to (alkene groups+epoxy groups)+/−20%. Therefore, the molar ratio of thiol groups of the polythiol to (alkene groups of the polyalkene plus the epoxy groups of the epoxy resin) will be from 0.75:1 to 1:0.75, preferably 0.9:1 to 1:0.9. In addition, the ratio of polyene and polyepoxide are variable from 95:5 to 5:95, depending on the needs and performance. With different curing conditions for thiol-alkene and thiol-epoxide, the step-wise curing is beneficial for curing heat control for high quality QDEF article, especially for thick articles, which may generate significant amount of heat if cured at the same time. The different ratio of alkene and epoxide provides the possibility for curing heat control.

In some embodiments (meth)acrylates are used in the matrix binder composition. Useful radiation curable methacrylate compounds have barrier properties to minimize the ingress of water and/or oxygen. In some embodiments, methacrylate compounds with a glass transition temperature ($T_g$) of greater than about 100° C. and substituents capable of forming high crosslink densities can provide a matrix with improved gas and water vapor barrier properties. In some embodiments, the radiation curable methacrylate compound is multifunctional, and suitable examples include, but are not limited to, those available under the trade designations SR 348 (ethoxylated (2) bisphenol A di(meth)acrylate), SR540 (ethoxylated (4) bisphenol A di(meth)acrylate), and SR239 (1,6-hexane diol di(meth)acrylate) from Sartomer USA, LLC, Exton, Pa.

The (meth)acrylate compound forms about 0 wt. % to about 25 wt. %, or about 5 wt. % to about 25 wt. % or about 10 wt. % to about 20 wt. %, of the matrix composition.

In embodiments where the thiol-alkene-epoxy polymer composition further comprises an (meth)acrylate component, the molar functional group equivalent of alkene plus the molar functional group equivalent of (meth)acrylate plus the molar equivalent of epoxy groups is equal to the thiol equivalents+/−20%.

Epoxy-ene compounds, such as allyl glycidyl ether, 1,2-epoxy-7-octene and 1,2-epoxy-9-decene, can be added in thiol-alkene-epoxide formulation for bridging the thiol-ene and thiol-epoxide matrices.

The thiol-alkene-epoxy resin may be prepared by combining the polythiol, polyalkene and epoxy resin in suitable ratios and then cured using a combination of free-radical (for thiol-alkene) and an amine or acid catalyst (for thiol-epoxide). In general, the matrix may be cured by a free radical step using a photo, thermal or redox initiator, followed by a thermal cure using an amine or acid catalyst. The amine or acid catalyst may be a photoacid or photobase catalyst. It will be understood that some thiol-alkene reactions do not require a free-radical catalyst, but it is preferred.

The thiol and alkene of the thiol-alkene-epoxy resin may be photo cured by exposure to actinic radiation such as UV light. The composition may be exposed to any form of actinic radiation, such as visible light or UV radiation, but is preferably exposed to UVA (320 to 390 nm) or UVV (395 to 445 nm) radiation. Generally, the amount of actinic radiation should be sufficient to form a solid mass that is not sticky to the touch. Generally, the amount of energy required for curing the compositions of the invention ranges from about 0.2 to 20.0 J/cm².

To initiate photopolymerization, the resin is placed under a source of actinic radiation such as a high-energy ultraviolet source having a duration and intensity of such exposure to provide for essentially complete (greater than 80%) polymerization of the composition contained in the molds. If desired, filters may be employed to exclude wavelengths that may deleteriously affect the reactive components or the photopolymerization. Photopolymerization may be affected via an exposed surface of the curable composition, or through the barrier layers as described herein by appropriate selection of a barrier film having the requisite transmission at the wavelengths necessary to effect polymerization.

Photoinitiation energy sources emit actinic radiation, i.e., radiation having a wavelength of 700 nanometers or less which is capable of producing, either directly or indirectly, free radicals capable of initiating polymerization of the thiol and alkene components of the matrix compositions. Preferred photoinitiation energy sources emit ultraviolet radiation, i.e., radiation having a wavelength between about 180 and 460 nanometers, including photoinitiation energy sources such as mercury arc lights, carbon arc lights, low, medium, or high pressure mercury vapor lamps, swirl-flow plasma arc lamps, xenon flash lamps ultraviolet light emitting diodes, and ultraviolet light emitting lasers. Particularly preferred ultraviolet light sources are ultraviolet light emitting diodes available from Nichia Corp., Tokyo Japan, such as models NVSU233A U385, NVSU233A U404, NCSU276A U405, and NCSU276A U385.

In one embodiment, the initiator is a photoinitiator and is capable of being activated by UV radiation. Useful photoinitiators include e.g., benzoin ethers such as benzoin methyl ether and benzoin isopropyl ether, substituted benzoin ethers, substituted acetophenones such as 2,2-dimethoxy-2-phenylacetophenone, and substituted alpha-ketols. Examples of commercially available photoinitiators include Irgacure™ 819 and Darocur™ 1173 (both available form BASF), Lucem TPO™ (available from BASF, Parsippany, N.J.) and Irgacure™ 651, (2,2-dimethoxy-1,2-diphenyl-1-ethanone) which is available from BASF. Preferred photoinitiators are ethyl 2,4,6-trimethylbenzoylphenyl phosphinate (Lucirin™ TPO-L) available from BASF, Mt. Olive, N.J., 2-hydroxy-2-methyl-1-phenyl-propan-1-one (IRGACURE 1173™, BASF), 2,2-dimethoxy-2-phenyl acetophenone (IRGACURE 651™, BASF), phenyl bis-(2,4,6-trimethyl benzoyl)phosphine oxide (IRGACURE 819, BASF). Other suitable photoinitiators include mercaptobenzothiazoles, mercaptobenzooxazoles and hexaryl bisimidazole.

Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2-azo-bis(isobutyronitrile), and t-butyl perbenzoate. Examples of commercially available thermal initiators include initiators available from DuPont Specialty Chemical (Wilmington, Del.) under the VAZO trade designation including VAZO™64 (2,2'-azo-bis(isobutyronitrile)) and VAZO™ 52, and Lucidol™ 70 from Elf Atochem North America, Philadelphia, Pa.

The thiol and alkene components may also be polymerized using a redox initiator system of an organic peroxide and a tertiary amine. Reference may be made to Bowman et al., Redox Initiation of Bulk Thiol-alkene Polymerizations, Polym. Chem., 2013, 4, 1167-1175, and references therein.

Generally, the amount of initiator is less than 5 wt. %, preferably less than 2 wt. %. In some embodiments, there is no added free radical initiator.

If desired, a stabilizer or inhibitor may be added to the thiol-alkene-epoxy composition to control the rate of the free radical reaction. The stabilizer can be any known in the art of thiol-alkene and/or epoxy resins and include the N-nitroso compounds described in U.S. Pat. No. 5,358,976 (Dowling et al.) and in U.S. Pat. No. 5,208,281 (Glaser et al.), and the alkenyl substituted phenolic compounds described in U.S. Pat. No. 5,459,173 (Glaser et al.).

Following free radical initiation, the epoxy resin component is thermally cured with the polythiol using an amine or acid catalyst. The catalyst may be a photocatalyst, including photoacid or photobase generators. In general, if the quantum dots are amine ligand stabilized, and amine catalyst for the epoxy is preferred. Similarly, if the quantum dots are acid-stabilized, acid catalysts are preferred.

The amine catalyst is used for the deprotonation of thiol (—SH) to thiolate (—S⁻) which reacts with epoxy group by nucleophilic ring opening polymerization. An amine catalyst can include one or more from the group: a cyclic amidine; a tertiary amine; a secondary amine; a substituted cyclic amidine, substituted tertiary amine, substituted secondary amine; or a combination thereof. The catalyst can comprise one or more of imidazole, imidazoline, pyrrolidine, a substituted imidazole compound, a substituted imidazoline compound, 1,4,5,6-tetrahydropyrimidine, a substituted 1,4,5,6-tetrahydropyrimidine compound, a substituted pyrrolidine compound, a substituted piperidine compound, and combinations thereof. The catalyst can also comprise an unsubstituted piperidine, an acyclic amidine or a substituted acyclic amidine. Examples of acyclic amidines that may be acceptable catalysts according to the present invention include NN'-dialkylalkylamidines, such as N,N'-dimethylalkylamidine and NN'-diethylmethylamidine.

A polyfunctional or multifunctional amine (e.g., a diamine containing both primary and secondary functionality or multiple primary functionality) will cause chain extending and cross linking (i.e., will function as a curing agent). Even though it will cause cross linking to occur, a polyfunctional amine or other curing agent may be used, but in a limited amount.

The amine catalyst for the epoxy resin may be selected from a photobase generator. On exposure to UV radiation, the photobase generator releases an amine, which catalyzes the addition of the thiol to the epoxy.

Photobase generators useful in the present invention are any compounds which liberate base upon exposure to light, typically at a wavelength of about 320 to 420 nanometers, however other wavelengths may be suitable. Suitable photobase generators include, but are not limited to: benzyl carbamates, benzoin carbamates, o-carbamoylhydroxyamines, O-carbamoyloximes, aromatic sulfonamides, alpha-lactams, N-(2-allylethenyl)amides, arylazide compounds, N-arylformamides, and 4-(ortho-nitrophenyl)dihydropyridines.

The photobase generator is not specifically limited so long as it generates an amine directly or indirectly with light irradiation. The photobase generator includes for example bis[[(2-nitrobenzyl)oxy]carbonylhexane-1,6-diamine], nitrobenzyl cyclohexyl carbamate, di(methoxybenzyl) hexamethylene dicarbamate and the compounds of the general formula:
$(R^5—NR^6)_x—R^7$, where $R^5$ is a photoactive group including benzyloxy groups and formal groups, $R^6$ is a hydrogen or alkyl group, $R^7$ is polyvalent alkyl or aryl group, and x is at least 1. It will be understood that the formula represents an amine photobase generator wherein the polyamine liberated by photolysis is of the formula $(HNR^6)_x—R^7$. For non-yellowing, non-aromatic base is preferred as the catalyst.

Photobase generators are further described in M. Shirai et al. Photochemical Reactions of Quaternary Ammonium Dithiocarbamates as *Photobase Generators and Their Use in The Photoinitiated Thermal Crosslinking of Poly(glycidylmethacrylate)*, Journal of Polymer Science, Part A: Polymer Chemistry, vol. 39, pp. 1329-1341 (2001) and M. Shirai et al., "Photoacid and photobase generators: chemistry and applications to polymeric materials", Progress in Polymer Science, vol. 21, pp. 1-45, XP-002299394, 1996.

Any suitable Ahrrhenius, Lewis acid or Bronsted-Lowry acid catalysts may be used to catalyze epoxy crosslinking reactions with the polythiol. Suitable acid catalysts include, but are not limited to: strong inorganic acids such as hydrochloric acid, sulfuric acid, phosphoric acid, and the like; and organic acids such as acetic acid, para-toluene sulfonic acid, and oxalic acid. Examples of useful catalysts are Lewis acid compounds, such as $BF_3$ amine complexes, $SbF_6$ sulfonium compounds, bisarene iron complexes, and Bronsted acid compounds, such pentafluoroantimonic acid complexes.

The acid catalyst may be selected from photoacid generators (PAGs). On irradiation with light energy, ionic photoacid generators undergo a fragmentation reaction and release one or more molecules of Lewis or Bronsted acid that catalyze the ring opening and addition of the pendent epoxy groups to form a crosslink. Useful photoacid generators are thermally stable and do not undergo thermally induced reactions with the copolymer, and are readily dissolved or dispersed in the crosslinkable composition. Photoacid generators are known and reference may be made to K. Dietliker, Chemistry and Technology of UV and EB Formulation for Coatings, Inks and Paints, vol. III, SITA Technology Ltd., London, 1991. Further reference may be made to Kirk-Othmer Encyclopedia of Chemical Technology, 4.sup.th Edition, Supplement Volume, John Wiley and Sons, New York, year, pp 253-255.

Cations useful as the cationic portion of the ionic photoinitiators of the invention include organic onium cations, for example those described in U.S. Pat. Nos. 4,250,311, 3,708,296, 4,069,055, 4,216,288, 5,084,586, 5,124,417, 5,554,664 and such descriptions incorporated herein by reference, including aliphatic or aromatic Group IVA VIIA (CAS version) centered onium salts, preferably I-, S-, P-, Se- N- and C-centered onium salts, such as those selected from, sulfoxonium, iodonium, sulfonium, selenonium, pyridinium, carbonium and phosphonium, and most preferably I-, and S-centered onium salts, such as those selected from sulfoxonium, diaryliodonium, triarylsulfonium, diarylalkylsulfonium, dialkylarylsulfonium, and trialkylsulfonium.

The nature of the counteranion in an ionic PAG can influence the rate and extent of cationic addition polymerization of the epoxy groups. For example, J. V. Crivello, and R. Narayan, Chem. Mater., 4, 692, (1992), report that the order of reactivity among commonly used nucleophilic anions is $^-SbF_6.>^-AsF_6>^-PF_6>^-BF_4$. The influence of the anion on reactivity has been ascribed to three principle factors: (1) the acidity of the protonic or Lewis acid generated, (2) the degree of ion-pair separation in the propagating cationic chain and (3) the susceptibility of the anions to fluoride abstraction and consequent chain termination. $^-B(C_6F_5)_4$ may also be used.

Useful onium salts include diazonium salts, such as aryl diazonium salts; halonium salts, such as diarlyiodonium salts; sulfonium salts, such as triarylsulfonium salts; selenonium salts, such as triarylselenonium salts; sulfoxonium salts, such as triarylsulfoxonium salts; and other miscellaneous classes of onium salts such as triaryl phosphonium and arsonium salts, and pyrylium and thiopyrylium salts.

Useful ionic photoacid generators include bis(4-t-butylphenyl) iodonium hexafluoroantimonate (FP5034™ from Hampford Research Inc., Stratford, Conn.), a mixture of triarylsulfonium salts (diphenyl(4-phenylthio) phenylsulfonium hexafluoroantimonate, bis(4-(diphenylsulfonio)phenyl)sulfide hexafluoroantimonate) available as Syna P1-6976™ from Synasia Metuchen, N.J., (4-methoxyphenyl)phenyl iodonium triflate, bis(4-tert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, ([4-(octyloxy)phenyl]phenyliodonium hexafluorophosphate), ([4-(octyloxy) phenyl]phenyliodonium hexafluoroantimonate), (4-isopropylphenyl)(4-methylphenyl)iodonium tetrakis (pentafluorophenyl) borate (available s Rhodorsil 2074™ from Bluestar Silicones, East Brunswick, N.J.), bis(4-methylphenyl) iodonium hexafluorophosphate (available as Omnicat 440™ from IGM Resins Bartlett, Ill.), 4-(2-hydroxy-1-tetradecycloxy)phenyl]phenyl iodonium hexafluoroantimonate, triphenyl sulfonium hexafluoroantimonate (available as CT-548™ from Chitec Technology Corp. Taipei, Taiwan), diphenyl(4-phenylthio)phenylsulfonium hexafluorophosphate, bis(4-(diphenyl sulfonio)phenyl)sulfide bis(hexafluorophosphate), diphenyl(4-phenylthio)phenylsulfonium hexafluoroantimonate, bis(4-(diphenyl sulfonio)phenyl)sulfide hexafluoroantimonate, and blends of these triarylsulfonium salts available from Synasia, Metuchen, N.J. under the trade designations of Syna PI-6992™ and Syna PI-6976™ for the $PF_6$ and $SbF_6$ salts, respectively.

The use of a photobase or photoacid generator may produce residue products from the photochemical production of base. Upon exposure to actinic radiation, the photobase generator will photolyze yielding an amine and a residue compound. For example, a bis-benzyl carbamate of a diamine will photolyze to yield the diamine and a phenyl ketone as the "residue of a photobase generator". Oxime esters will yield ketones. Such residues are present in small amounts and do not normally interfere with the desired optical properties of the resulting polarizer. The residues may be detected by conventional analytical techniques, such as infrared, ultraviolet and NMR spectroscopy, gas or liquid chromatography, mass spectroscopy, or a combination of such techniques. Thus, the present invention may comprise cured thiol-alkene-epoxy matrix copolymer and detectable amounts of residues from a photobase/acid generator.

Generally the catalyst for the epoxy resin is used in amounts of at least about 0.05 wt-%, more preferably at least about 0.1 wt-%, in the range of from about 0.1 wt-% to about 5 wt-% or, more preferably, in the range of from about 0.5 wt-% to about 2 wt-%, based on the total amount of the epoxy groups and the molecular weight of the catalyst.

Referring to FIG. 1, quantum dot article 10 includes a first barrier layer 32, a second barrier layer 34, and a quantum dot layer 20 between the first barrier layer 32 and the second barrier layer 34. The quantum dot layer 20 includes a plurality of quantum dots 22 dispersed in a matrix 24.

The barrier matrix layers 32, 34 can be formed of any useful material that can protect the quantum dots 22 from exposure to environmental contaminates such as, for example, oxygen, water, and water vapor. Suitable barrier layers 32, 34 include, but are not limited to, films of polymers, glass and dielectric materials. In some embodiments, suitable materials for the barrier layers 32, 34 include, for example, glass and polymers such as polyethylene terephthalate (PET), PEN, polyethers, or PMMA; oxides such as silicon oxide, titanium oxide, or aluminum oxide (e.g., $SiO_2$, $Si_2O_3$, $TiO_2$, or $Al_2O_3$); and suitable combinations thereof. The barrier layers are desirable at least 90%, preferably at least 95%, transmissive to the selected wavelength of incident and emitted radiation.

More particularly, barrier matrixes can be selected from a variety of constructions. Barrier matrixes are typically selected such that they have oxygen and water transmission rates at a specified level as required by the application. In some embodiments, the barrier matrix layer has quantum dots dispersed in the matrix and laminated between two transparent barrier films as film article. In some embodiments, the film article has quantum yield no less than that of the original quantum dots. In some embodiments, the barrier film has a water vapor transmission rate (WVTR) less than about 0.005 $g/m^2$/day at 38° C. and 100% relative humidity; in some embodiments, less than about 0.0005 $g/m^2$/day at 38° C. and 100% relative humidity; and in some embodiments, less than about 0.00005 $g/m^2$/day at 38° C. and 100% relative humidity for better protection of oxygen and moisture sensitive quantum dots. In some embodiments, the flexible barrier film has a WVTR of less than about 0.05, 0.005, 0.0005, or 0.00005 $g/m^2$/day at 50° C. and 100% relative humidity or even less than about 0.005, 0.0005, 0.00005 $g/m^2$/day at 85° C. and 100% relative humidity. In some embodiments, the barrier film has an oxygen transmission rate of less than about 0.005 $g/m^2$/day at 23° C. and 90% relative humidity; in some embodiments, less than about 0.0005 $g/m^2$/day at 23° C. and 90% relative humidity; and in some embodiments, less than about 0.00005 $g/m^2$/day at 23° C. and 90% relative humidity.

Exemplary useful barrier films include inorganic films prepared by atomic layer deposition, thermal evaporation, sputtering, and chemical vapor deposition. Useful barrier films are typically flexible and transparent. In some embodiments, useful barrier films comprise inorganic/organic. Flexible ultra-barrier films comprising inorganic/organic multilayers are described, for example, in U.S. Pat. No. 7,018,713 (Padiyath et al.). Such flexible ultra-barrier films may have a first polymer layer disposed on polymeric film substrate that is overcoated with two or more inorganic barrier layers separated by at least one second polymer layer. In some embodiments, the barrier film comprises one inorganic barrier layer interposed between the first polymer layer disposed on the polymeric film substrate and a second polymer layer 224.

Optionally, the barrier films comprise one or more primer layers for further improved barrier performance as well as adhesion of quantum dots layer on barrier layers. However, with the thiol-alkene-epoxy matrix, primer layers are not required.

In some embodiments, each barrier layer 32, 34 of the quantum dot article 10 includes at least two sub-layers of different materials or compositions. In some embodiments, such a multi-layered barrier construction can more effectively reduce or eliminate pinhole defect alignment in the barrier layers 32, 34, providing a more effective shield against oxygen and moisture penetration into the matrix 24. The quantum dot article 10 can include any suitable material or combination of barrier materials and any suitable number of barrier layers or sub-layers on either or both sides of the quantum dot layer 20. The materials, thickness, and number of barrier layers and sub-layers will depend on the particular application, and will suitably be chosen to maximize barrier protection and brightness of the quantum dots 22 while minimizing the thickness of the quantum dot article 10. In some embodiments each barrier layer 32, 34 is itself a laminate film, such as a dual laminate film, where each barrier film layer is sufficiently thick to eliminate wrinkling in roll-to-roll or laminate manufacturing processes. In one illustrative embodiment, the barrier layers 32, 34 are polyester films (e.g., PET) having an oxide layer on an exposed surface thereof.

The quantum dot layer 20 can include one or more populations of quantum dots or quantum dot materials 22. Exemplary quantum dots or quantum dot materials 22 emit green light and red light upon down-conversion of blue primary light from a blue LED to secondary light emitted by the quantum dots. The respective portions of red, green, and blue light can be controlled to achieve a desired white point for the white light emitted by a display device incorporating the quantum dot article 10. Exemplary quantum dots 22 for use in the quantum dot articles 10 include, but are not limited to, CdSe with ZnS shells. Suitable quantum dots for use in quantum dot articles described herein include, but are not limited to, core/shell luminescent nanocrystals including CdSe/ZnS, InP/ZnS, PbSe/PbS, CdSe/CdS, CdTe/CdS or CdTe/ZnS. In exemplary embodiments, the luminescent nanocrystals include an outer ligand coating and are dispersed in a polymeric matrix. Quantum dot and quantum dot materials 22 are commercially available from, for example, Nanosys Inc., Milpitas, Calif. The quantum dot layer 20 can have any useful amount of quantum dots 22, and in some embodiments the quantum dot layer 20 can include from 0.1 wt % to 20 wt % quantum dots, based on the total weight of the quantum dot layer 20.

In some embodiments the quantum dots may be additionally functionalized with ligand compounds of the formula:

$$R^8—(X)_p \qquad \text{VII}$$

wherein
$R^8$ is (hetero)hydrocarbyl group having $C_2$ to $C_{30}$ carbon atoms; preferably a linear or branched alkyl of 10 to 30 carbon atoms or a polysiloxane;
p is at least one; preferably at least two
X is an electron-donating group. Preferably X is an amino group or a thiol. Such additional ligands may be added when the functionalizing with the ligands of Formula I. Generally, there are many ligand molecules per nanoparticle. The ligands are in excess of the nanocrystals to insure coverage of the QDs.

In some embodiments, the quantum dot materials can include quantum dots dispersed in a liquid carrier, which may be ligand functional or non-functional. For example, the liquid carrier can include an oil such as an aminosilicone oil. Desirably, the liquid carrier is chosen to match the transmissivity of the polymer matrix. To increase the optical path length through the quantum dot layer and improve quantum dot absorption and efficiency, the difference in the refractive indices of the carrier liquid and the polymer matrix is ≥0.05, preferably ≥0.1.

The amino-substituted silicone carrier liquid (ligand functional carrier liquid) has the following Formula VI:

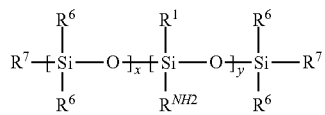

wherein
each $R^6$ is independently an alkyl or aryl;
$R^{NH2}$ is a n amine-substituted (hetero)hydrocarbyl group;
x is 1 to 2000; preferably 3 to 100;
y may be zero;
x+y is at least one;
$R^7$ is alkyl, aryl or $R^{NH2}$
wherein amine-functional silicone has at least two $R^{NH2}$ groups.

Useful amino-silicones, and method of making the same, are described in US 2013/0345458 (Freeman et al.), incorporated herein by reference. Useful amine-functional silicones are described in Lubkowsha et al., Aminoalkyl Functionalized Siloxanes, Polimery, 2014 59, pp 763-768, and are available from Gelest Inc, Morrisville, Pa., from Dow Corning under the Xiameter™, including Xiamter OFX-0479, OFX-8040, OFX-8166, OFX-8220, OFX-8417, OFX-8630, OFX-8803, and OFX-8822. Useful amine-functional silicones are also available from Siletech.com under the tradenames Silamine™, and from Momentive.com under the tradenames ASF3830, SF4901, Magnasoft, Magnasoft PlusTSF4709, Baysilone OF-TP3309, RPS-116, XF40-C3029 and TSF4707.

A particularly preferred aminosilicone the GP-988 available from Genesee Polymer Corp, Burton, MU having the formula:

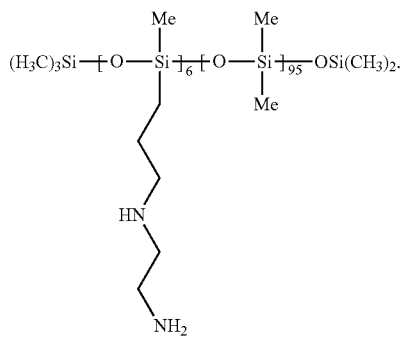

An example of a ligand system for CdSe-based quantum dots is a liquid aminosilicone type oil with both bound material and additional material of similar composition. An example of a ligand system for InP-based quantum dots is bound medium chain carboxylic acid species with a solid polymer (e.g., isobornyl methacrylate) as an additional material, or with carboxylate groups in the polymer bonded to the quantum dots as well.

In some embodiments, the ligand system can be a liquid at the time of infiltration, and subsequently converted to a solid by curing, polymerization, or solvent removal. In some embodiments the ligand system may remain liquid to provide droplets of quantum dots dispersed in a carrier liquid, in turn dispersed in a polymer matrix.

In some embodiments the amount of ligand and carrier liquid (ligand functional or non-functional) is ≥60 wt. %, preferably ≥70 wt. %, more preferably ≥80 wt. %, relative to the total including the inorganic nanoparticles. In other words, the ligand stabilized quantum dots comprise ≥60 wt. % of ligand compound of Formula VII and/or silicone of Formula VI, relative to the total weight of the stabilized quantum dots.

In one or more embodiments the quantum dot layer 20 can optionally include scattering beads or particles. These scattering beads or particles have a refractive index that differs from the refractive index of the matrix material 24 by at least 0.05, or by at least 0.1. These scattering beads or particles can include, for example, polymers such as silicone, acrylic, nylon, and the like, or inorganic materials such as $TiO_2$, $SiO_x$, $AlO_x$, and the like, and combinations thereof. In some embodiments, including scattering particles in the quantum dot layer 20 can increase the optical path length through the quantum dot layer 20 and improve quantum dot absorption and efficiency. In many embodiments, the scattering beads or particles have an average particle size from 1 to 10 micrometers, or from 2 to 6 micrometers. In some embodiments, the quantum dot material 20 can optionally include fillers such fumed silica.

In some preferred embodiments, the scattering beads or particles are inorganic beads such as Tospearl™ 120A, 130A, 145A and 2000B spherical silicone resins available in 2.0, 3.0, 4.5 and 6.0 micron particle sizes respectively from Momentive Specialty Chemicals Inc., Columbus, Ohio. Other useful scattering particles are organic beads available from Nagase America or from Sekisui Chemicals.

The matrix 24 of the quantum dot layer 20 from the thiol-alkene-epoxy resin described herein that adheres to the materials forming the barrier layers 32, 34 to form a laminate construction, and also forms a protective matrix for the quantum dots 22. In one embodiment, the matrix 24 is formed by curing the thiol-alkene-epoxy composition including an optional radiation-curable methacrylate compound.

Figure 2:
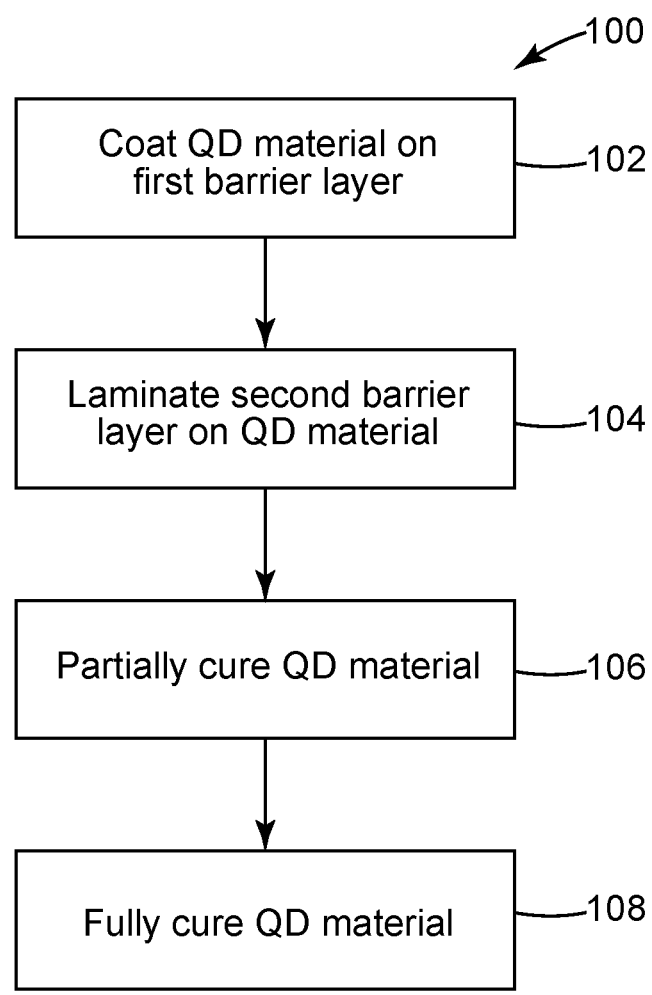
FIG. 2 is a flow diagram of an illustrative method of forming a quantum dot film.

Referring to FIG. 2, in another aspect, the present disclosure is directed to a method of forming a quantum dot film article 100 including coating a thiol-alkene-epoxy composition including quantum dots on a first barrier layer 102 and disposing a second barrier layer on the quantum dot material 104. In some embodiments, the method 100 includes polymerizing (e.g., radiation curing) the radiation curable thiol-alkene-epoxy to form a partially cured quantum dot material 106 and further polymerizing the binder composition to form a cured matrix 108. In some embodiments, the thiol-alkene-epoxy resin may be fully cured in 106.

In some embodiments, the binder composition can be cured or hardened by heating. In other embodiments, the quantum dot composition may also be cured or hardened by applying radiation such as, for example, ultraviolet (UV) light. Curing or hardening steps may include UV curing, heating, or both. In some example embodiments that are not intended to be limiting, UV cure conditions can include applying about 10 mJ/cm$^2$ to about 4000 mJ/cm$^2$ of UVA, more preferably about 10 mJ/cm$^2$ to about 200 mJ/cm$^2$ of UVA. Heating and UV light may also be applied alone or in combination to increase the viscosity of the binder composition, which can allow easier handling on coating and processing lines.

The quantum dot composition generally has viscosity of at least 200 cPs, and up to 15,000 cPs, preferably 500 to 10,000 cPs and most preferably between 1000 and 3000 cPs. The desired coatable viscosity is achieved by selection of the associated polythiol, polyalkene and epoxy resin.

In some embodiments, the binder composition may be cured after lamination between the overlying barrier films 32, 34. Thus, the increase in viscosity of the binder composition locks in the coating quality right after lamination. By curing right after coating or laminating, in some embodiments the cured binder increases in viscosity to a point that the binder composition acts as an adhesive to hold the laminate together during the cure and greatly reduces defects during the cure. In some embodiments, the radiation cure of the binder provides greater control over coating, curing and web handling as compared to traditional thermal curing.

Once at least partially cured, the binder composition forms polymer network that provides a protective supporting matrix 24 for the quantum dots 22.

Ingress, including edge ingress, is defined by a loss in quantum dot performance due to ingress of moisture and/or oxygen into the matrix 24. In various embodiments, the edge ingress of moisture and oxygen into the cured matrix 24 is less than about 1.0 mm after 1 week at 85° C., or about less than 0.75 mm after 1 week at 85° C., or less than about 0.5 mm after 1 week at 85° C. or less than 0.25 mm after 1 week at 85° C. In various embodiments the matrix has a moisture and oxygen ingress of less than about 0.5 mm after 500 hours at 65° C. and 95% relative humidity.

In various embodiments, oxygen permeation into the cured matrix is less than about 80 (cc·mil)/(m$^2$ day), or less than about 50 (cc·mil)/(m$^2$ day). In various embodiments, the water vapor transmission rate of the cured matrix should be less than about 15 (20 g/m$^2$·mil·day), or less than about 10 (20 g/m$^2$·mil·day).

In various embodiments, the color change observed upon aging is defined by a change of less than 0.02 on the 1931 CIE (x,y) Chromaticity coordinate system following an aging period of 1 week at 85° C. In certain embodiments, the color change upon aging is less than 0.005 on the following an aging period of 1 week at 85° C. In certain embodiments the matrix has a color shift d(x,y) using the CIE1931 (x,y) convention of less than about 0.02 after 100 hours at 65° C. and 95% relative humidity.

The thiol-alkene-epoxy matrix has a transmissivity of at least 85%, preferably at least 90%, more preferably at least 95%, in the spectral region of incident radiation, typically region of 450±50 nm. Further, the thiol-alkene-epoxy matrix has an average transmissivity of at least 85%, preferably at least 90%, more preferably at least 95%, in the visible region of 450 to 750 nm.

In various embodiments, the thickness of the quantum dot layer 20 is about 25-500 microns, generally 40 to about 250 microns.

Figure 3:
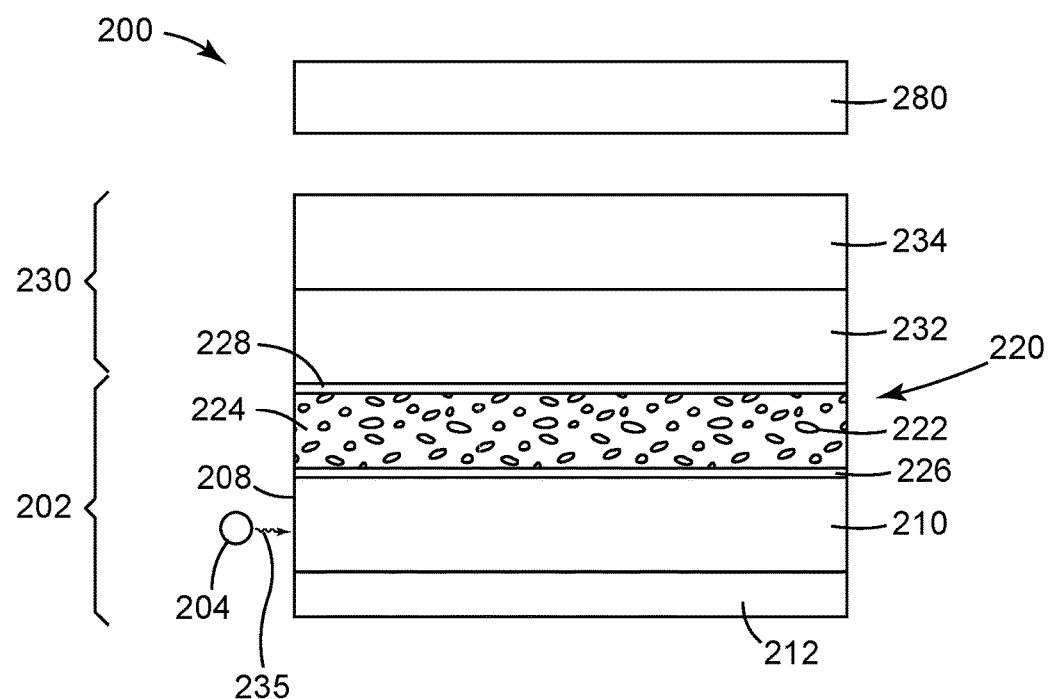
FIG. 3 is a schematic illustration of an embodiment of a display including a quantum dot article.

The quantum efficiency of the dots in the thiol-alkene-epoxy matrix often exceeds the efficiency of the quantum dots in solution. The quantum dot article can achieve an external quantum efficiency (EQE)>85%, preferably >90% as measured by a Hamamatsu™ Quantarus using Nanosys supplied quantum dots. See http://www.hamamatsu.com/us/en/product/alpha/P/5033/index.html FIG. 3 is a schematic illustration of an embodiment of a display device 200 including the quantum dot articles described herein. This illustration is merely provided as an example and is not intended to be limiting. The display device 200 includes a backlight 202 with a light source 204 such as, for example, a light emitting diode (LED). The light source 204 emits light along an emission axis 235. The light source 204 (for example, a LED light source) emits light through an input edge 208 into a hollow light recycling cavity 210 having a back reflector 212 thereon. The back reflector 212 can be predominately specular, diffuse or a combination thereof, and is preferably highly reflective. The backlight 202 further includes a quantum dot article 220, which includes a protective matrix 224 having dispersed therein quantum dots 222. The protective matrix 224 is bounded on both surfaces by polymeric barrier films 226, 228, which may include a single layer or multiple layers.

The display device 200 further includes a front reflector 230 that includes multiple directional recycling films or layers, which are optical films with a surface structure that redirects off-axis light in a direction closer to the axis of the display, which can increase the amount of light propagating on-axis through the display device, this increasing the brightness and contrast of the image seen by a viewer. The front reflector 230 can also include other types of optical films such as polarizers. In one non-limiting example, the front reflector 230 can include one or more prismatic films 232 and/or gain diffusers. The prismatic films 232 may have prisms elongated along an axis, which may be oriented parallel or perpendicular to an emission axis 235 of the light source 204. In some embodiments, the prism axes of the prismatic films may be crossed. The front reflector 230 may further include one or more polarizing films 234, which may include multilayer optical polarizing films, diffusely reflecting polarizing films, and the like. The light emitted by the front reflector 230 enters a liquid crystal (LC) panel 280. Numerous examples of backlighting structures and films may be found in, for example, U.S. Publication No. U.S. Pat. No. 8,848,132 (Epstein et al.).

EXAMPLES

Materials

| Designation | Description | Source |
|---|---|---|
| S4 | Pentaerythritol tetra (3-mercaptopropionate), [C(CH$_2$OC(O)CH$_2$CH$_2$SH)$_4$, CAS#7575-23-7, MW = 488.66] | TCI America, Portland, OR |
| TEMPIC | Tris[2-(3-mercaptopropionyloxy)ethyl] Isocyanurate, [CAS#36196-44-8, MW = 525.62 (EW = 175.206)] | Bruno Bock Chemische Fabrik GmbH & Co. KG, Marshacht, Germany |
| BPADGE | Bisphenol A diglycidyl ether (CAS#1675-54-3, MW = 340.42; Lot#H26Z052) | Alfa-Aesar, Ward Hill, MA |
| SiO$_2$ | Micro-fine silicone resins (2 mm, particle size is finely controlled for optimum consistency), under trade designation "TOSPEARL 120". | Momentive Performance Materials Inc., Waterford, NY |
| TAIC | Triallyl Isocyanurate [CAS#1025-15-6, MW = 249.27] | TCI America, Portland, OR |

| Designation | Description | Source |
|---|---|---|
| DABPA | 2, 2'-Diallyl Bisphenol A [CAS#1745-89-7, MW = 308.41]<br />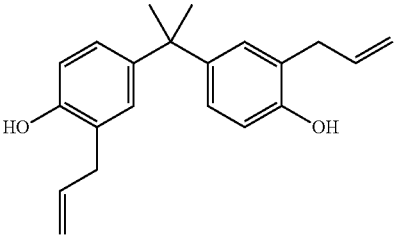 [SMILES: C=CCc1cc(C(C)(C)c2ccc(O)c(CC=C)c2)ccc1O] | Aldrich Chemical Co., Milwaukee, WI |
| EPON 828 | an undiluted clear difunctional bisphenol A/epichlorohydrin derived liquid epoxy resin with epoxide equivalent weight of 185-192 and viscosity of 110-150, under trade designation "EPON 828" | Momentive Performance Materials Inc., Waterford, NY |
| GY 6005 | Bisphenol A Epoxy Liquid Resin (epoxide equivalent weight; 182-196; viscosity: 7,500-9,500 cP), under trade designation "ARALDITE GY 6005" | Huntsman Advanced Materials, Woodlands, TX |
| GY 282 | Bisphenol F Epoxy Resin with epoxide equivalent weight of 166 to 176 (viscosity: 3300-4100 cP), under trade designation "ARALDITE GY 282" | |
| GY 285 | Bisphenol F Epoxy Resin with epoxide equivalent weight of 163 to 172 (viscosity: 2000-3000 cP), "ARALDITE GY 285" | |
| PY 306 | Distilled, very low viscosity, unmodified epoxy resin based on bisphenol-F (viscosity: 1,200-1,600 cP; epoxide equivalent weight: 156-167), under trade designation "ARALDITE PY 306" | |
| TCDDA | Tricyclodecane dimethanol diacrylate | Kowa American Co., New York, NY |
| DER 732 | A liquid Epoxy Resin produced from epichlorohydrin and polypropylene glycol (Epoxide Equivalent Weight of 310-330 g/eq and Viscosity @ 25° C. of 60-70 mPa • s) under trade designation "DER 732" | Dow Chemical Company, Midland, MI |
| QD-1 | Green CdSe quantum dots stabilized with amine-functionalized silicone (Part#QCEF53040R2-01) | Nanosys, Inc., Milpitas, CA |
| QD-2 | Red CdSe quantum dots stabilized with amine-functionalized silicone (part# QCEF62290R2-01) | |

Methods

General Method for Preparing Matrix Coating Formulations

About 20 g of matrix coating formulations for each Example and Comparative Example described below were prepared by mixing a polythiol, a polyene and polyepoxide at a desired equivalent ratio and then adding about 1 g of a quantum dot (QD) mixture (containing QD-1 (0.8 g) and QD-2 (0.2 g)) and a photo-initiator (1%, ~0.2 g TPO-L) and a base catalyst (0.5%, ~0.1 g $Me_2NCH_2CH_2OH$), which was fully mixed using a Cowles blade mixer at the speed of 1400 rpm for 2 minutes in a nitrogen box. In the case of Comparative Examples the initiator was a base catalyst (0.75%, 0.15 g $Me_2NCH_2CH_2OH$).

Then, the above prepared formulations were knife-coated between two release films (SILPHAN S 36 M, 1R 10003 Clear 152 m, obtained from Siliconature S.P.A., Chicago Ill.) at a thickness of about 100 μm and cured by exposing the coated film under 385 nm LED UV light (obtained from Clearstone Technologies, Hopkins, Minn.) for 30 seconds. The coated and cured films were used for thermal analysis as described below.

Then, the above prepared formulations were knife-coated between two 2-mils (50 μm) thick primed PET barrier films (FTB3-M-50, available from 3M Company, St. Paul, Minn. under trade designation "3M FTB3 BARRIER FILM") at a thickness of about 100 μm and cured by exposing the coated film under 385 nm LED UV light for 30 seconds followed by thermal curing in an 110° C. oven for 5 minutes. The cured film is used for quantum yield measurement and aging study.

Method for Determining Coating Quality

Quality of the matrices made according to above described procedure was examined visually. "Poor" means non-uniform matrix with significant thickness variation; "uneven" means non-uniform matrix with some wave-lines;

"OK" means acceptable quality; "Good" means very limited uneven areas in matrix; and "Great" means uniform matrix with no identified defect.

Method for Thermal Analysis

Thermal analyses were carried out using a Q200 Differential Scanning Calorimeter (TA Instruments, New Castle, Del.). Differential Scanning Calorimeter (DSC) scans were carried out from −75° C. to 150° C. at heating rate of 3° C./min. Glass transition temperature (Tg) was determined.

Method for Measuring Quantum Yield (QY)

All quantum yields (EQE) were measured by using an absolute PL Quantum Yield Spectrometer C11347 (Hamamatsu Corporation, Middlesex, N.J.).

Method for Aging Studies

The aging study was conducted by sitting the cut film prepared in the Examples below in 85° C. oven for 7 days, then EQE and edge ingress were measured for assessing the aging stability.

Method for Determining Edge Ingress

The edge ingress of the cured matrix with two barrier films was measured from a cut edge of a matrix film by a ruler under a magnifier after it was aged as described above. The quantum dots at the edge exhibited a black-line under a blue light if the quantum dots were degraded by oxygen and/or moisture during the aging and were not emitting green and/or red light. The edge ingress number indicates how deep the quantum dots from the cut edge has been degraded.

Examples 1-29 (EX1-EX-29) and Comparative Examples 1-11 (CE1 to CE11)

EX1-EX29 and CE1 to CE10 matrix coating formulations were prepared according to the general method for preparing matrix coating formulations described above. The matrix coating formulations were varied. The resulting matrix films were evaluated for their coating quality, thermal analysis, quantum yield measurements, and edge ingress using test methods described above. The quantum yield measurements were carried on as prepared samples (i.e., before aging) and after subjecting them to an aging stability test as described above (i.e., after aging).

Table 1, below, summarizes the matrix coating formulations and the quality resulting matrix films for each of EX1-EX29 and CE1-CE10.

Table 2, below, summarizes the Tg, and QY data (EQE %, Abs %) for as prepared samples and QY data (EQE %, Abs %) and Edge Ingress for the same samples after aging for selected Examples. CE11 was "3M QUANTUM DOT ENHANCEMENT FILM" with epoxy-amine/acrylate matrixes cured by UV and thermal process, available from 3M Company, Saint Paul, Minn.

TABLE 1

| Example | Matrix Formulation (Equivalent ratio) | Initiator | Matrix Quality |
|---|---|---|---|
| CE1 | S4/BPADGE (1/1) | Base | Poor |
| CE2 | S4/BPADGE (1/1) + 4% SiO2 | Base | Poor |
| EX1 | S4/BPADGE/TAIC (1/0.9/0.1) | Base/TPO-L | uneven |
| EX2 | S4/BPADGE/TAIC (1/0.8/0.2) | Base/TPO-L | OK |
| EX3 | S4/BPADGE/TAIC (1/0.7/0.3) | Base/TPO-L | Good |
| EX4 | S4/BPADGE/TAIC (1/0.6/0.4) | Base/TPO-L | Great |
| EX5 | S4/BPADGE/TAIC (1/0.5/0.5) | Base/TPO-L | Great |
| EX6 | S4/BPADGE/TAIC (1/0.25/0.75) | Base/TPO-L | Great |
| EX7 | S4/BPADGE/TAIC (1/0.2/0.8) | Base/TPO-L | Great |
| EX8 | S4/BPADGE/TAIC (1/0.1/0.9) | Base/TPO-L | Great |
| EX9 | S4/BPADGE/DABPA (1/0.5/0.5) | Base/TPO-L | Great |

TABLE 1-continued

| Example | Matrix Formulation (Equivalent ratio) | Initiator | Matrix Quality |
|---|---|---|---|
| EX10 | S4/BPADGE/DABPA (1/0.75/0.25) | Base/TPO-L | Great |
| EX11 | S4/BPADGE/DABPA (1/0.25/0.75) | Base/TPO-L | Great |
| CE3 | S4/EPON828 (1/1) | Base | Poor |
| EX12 | S4/EPON828/TAIC (1/0.5/0.5) | Base/TPO-L | Great |
| EX13 | S4/EPON828/TAIC (1.1/0.5/0.5) | Base/TPO-L | Great |
| EX14 | S4/EPON828/TAIC (1.1/0.75/0.25) | Base/TPO-L | Great |
| EX15 | S4/EPON828/TAIC (1.1/0.25/0.75) | Base/TPO-L | OK |
| EX16 | S4/EPON828/TAIC (1.1/0.9/0.1) | Base/TPO-L | Poor |
| EX17 | S4/EPON828/TAIC (1.1/0.1/0.9) | Base/TPO-L | Great |
| CE4 | S4/GY6005 (1/1) | Base | Poor |
| EX18 | S4/GY6005/TAIC (1/0.9/0.1) | Base/TPO-L | Poor |
| EX19 | S4/GY6005/TAIC (1/0.75/0.25) | Base/TPO-L | OK |
| EX20 | S4/GY6005/TAIC (1/0.5/0.5) | Base/TPO-L | Great |
| EX21 | S4/GY6005/TAIC (1/0.25/0.75) | Base/TPO-L | Great |
| EX22 | S4/GY6005/TAIC (1/0.1/0.9) | Base/TPO-L | Great |
| CE5 | S4/GY282 (1/1) | Base | Poor |
| EX23 | S4/GY282/TAIC (1/0.5/0.5) | Base/TPO-L | Great |
| CE6 | S4/GY285 (1/1) | Base | Poor |
| EX24 | S4/GY285/TAIC (1/0.5/0.5) | Base/TPO-L | Great |
| CE7 | S4/PY306 (1/1) | Base | Poor |
| EX25 | S4/PY306/TAIC (1/0.5/0.5) | Base/TPO-L | Great |
| EX26 | S4/BPADGE/TCDDA/(1/0.9/0.1) | Base | OK |
| CE8 | TEMPIC/BPADGE (1/1) | Base | Poor |
| EX27 | TEMPIC/BPADGE/TAIC (1/0.2/0.8) | Base/TPO-L | Good |
| CE9 | TEMPIC/DER732 (1/1) | Base | Poor |
| EX28 | TEMPIC/DER732/TAIC (1/0.5/0.5) | Base/TPO-L | Great |
| CE10 | TEMPIC/GY285 (1/1) | Base | Poor |
| EX29 | TEMPIC/GY285/TAIC (1/0.5/0.5) | Base/TPO-L | Great |

While not wishing to be bound by theory, all thiol-epoxy based formulations (CE1 to CE10) were harder to get uniform matrixes in acceptable quality by general coating and curing process since the strong exothermic heat generated during the curing. By blending photo-curable thiol-alkene with thermal curable thiol-epoxy resins, matrixes with great quality have be achieved by diluting the curing heat to two separated curing processes, photo-irradiation curing first then thermal curing or vice versa. The curing heat at each curing processes can be easily adjusted by the ratio of ene and epoxy resins.

TABLE 2

| Example | | Before Aging | | After Aging | | Edge Ingress (mm) |
|---|---|---|---|---|---|---|
| | Tg | EQE % | Abs % | EQE % | Abs % | |
| EX4 | 41.3 | 90 | 43.1 | 85 | 42.2 | 0.25 |
| EX5 | 53.5 | 90 | 40.8 | 86 | 40.2 | 0.25 |
| EX6 | 40.4 | 89 | 38.6 | 89 | 39.8 | 0.25 |
| EX8 | 53.7 | 89 | 43.2 | 85 | 44.3 | 0.25 |
| EX9 | 43.3 | 88 | 50.5 | 85 | 53.3 | <0.25 |
| EX10 | 20.2 | 90 | 66.8 | 86 | 64.8 | <0.25 |
| EX11 | 32.2 | 84 | 55.7 | 81 | 53.2 | <0.25 |
| EX19 | 45.3 | 86 | 44.4 | 83 | 45.3 | 0.25 |
| EX20 | 42.7 | 86 | 39.7 | 82 | 40.7 | 0.25 |
| EX23 | 47.4 | 90 | 43.5 | 87 | 43.9 | <0.5 |
| EX24 | 45.7 | 88 | 44.3 | 84 | 45.4 | <0.5 |
| EX25 | 48.5 | 90 | 47.8 | 84 | 47.6 | <0.5 |
| CE11 | 40.0 | 77.4 | 40.9 | 74.3 | 38.9 | 1.0 |

What is claimed is:

1. A composition comprising quantum dots dispersed in a thiol-alkene-epoxy resin matrix, wherein the thiol-alkene-epoxy resin matrix is derived from at least one polythiol, at least one polyalkene and at least one polyepoxy resin, wherein each has a functionality ≥2; and wherein the stoichiometric molar ratio of thiol groups of the at least one polythiol to alkene groups of the polyalkene plus epoxy groups of the at least one polyepoxy resin is from 0.75:1 to 1:0.75.

2. The composition of claim 1 wherein the at least one polyalkene is of the formula:

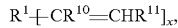

where
R$^1$ is a polyvalent (hetero)hydrocarbyl group,
each of R$^{10}$ and R$^{11}$ are independently H or C$_1$-C$_4$ alkyl; and x is ≥2.

3. The composition of claim 1 wherein the at least one polythiol is of the formula:

where R$^2$ is (hetero)hydrocarbyl group having a valence of y, and y is ≥2.

4. The composition of claim 1 wherein the at least one polythiol is obtained by esterification of a polyol with a terminally thiol-substituted carboxylic acid.

5. The composition of claim 1 wherein the at least one polyalkene is of the formula:

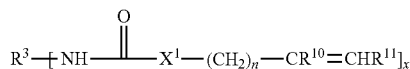

where
R$^3$ is a (hetero)hydrocarbyl group;
X$^1$ is O—, —S— or —NR4-, where R$^4$ is H of C$_1$-C$_4$ alkyl;
each of R$^{10}$ and R$^{11}$ are independently H or C$_1$-C$_4$ alkyl;
n is at least one,
x is ≥2.

6. The composition of claim 1 wherein the at least one polyepoxy resin is a glycidyl ether of the formula:

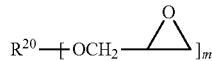

wherein
R$^{20}$ is a (hetero)hydrocarbyl radical and m is 1 to 6.

7. The composition of claim 1 wherein the ratio of alkene groups of the at least one polyalkene and epoxy groups of the at least one polyepoxy resin are from 95:5 to 5:95.

8. The composition of claim 1 wherein the quantum dots are core-shelled quantum dots stabilized by an organic ligand.

9. The composition of claim 1 wherein the quantum dots are selected from the group consisting of CdSe/ZnS and InP/ZnS.

10. The composition of claim 1, wherein the weight ratio of quantum dots in the thiol-alkene-epoxy matrix is 0.1% to 20%.

11. The composition of claim 1 wherein the thiol-alkene-epoxy resin matrix has no (meth)acrylate or alkynyl groups.

12. A quantum dot article comprising:
a first barrier layer;
a second barrier layer; and
a quantum dot layer between the first barrier layer and the second barrier layer, the quantum dot layer comprising quantum dots dispersed in a matrix comprising a cured thiol-alkene-epoxy resin of claim 1, having a T$_g$>20° C.

13. The quantum dot article of claim 12, wherein the stoichiometric molar ratio of thiol groups of the at least one polythiol to alkene groups of the at least one polyalkene plus the epoxy groups of the at least one polyepoxy resin is from 0.75:1 to 1:0.75.

14. The quantum dot article of claim 12 wherein the ratio of alkene groups of the at least one polyalkene and epoxy groups of the at least one polyepoxy resin are from 95:5 to 5:95.

15. The quantum dot article of claim 12 wherein the quantum dots are core-shelled quantum dots stabilized by an organic ligand.

16. The quantum dot article of claim 15 wherein the quantum dots are selected from the group consisting of CdSe/ZnS and InP/ZnS.

17. The quantum dot article of claim 12, wherein the thiol-alkene-epoxy resin matrix further comprises scattering particles having an average size in a range from 1 to 10 micrometers.

18. The quantum dot article of claim 12, wherein the thickness of the quantum dot layer between the first and second barrier layers is 25~500 um.

19. A display device comprising the quantum dot article of claim 12.

20. A method of forming a quantum dot article comprising:
a first barrier layer;
a second barrier layer; and
a quantum dot layer between the first barrier layer and the second barrier layer, the quantum dot layer comprising quantum dots dispersed in a matrix comprising a cured thiol-alkene-epoxy resin having a T$_g$>20° C.;
comprising the steps of coating the composition of claim 1 on a first barrier layer, laminating the second barrier layer, and curing.

* * * * *